(12) United States Patent
Erickson et al.

(10) Patent No.: US 6,501,242 B1
(45) Date of Patent: Dec. 31, 2002

(54) REDUCED NOISE ELECTRIC MOTOR FOR DISK DRIVE DATA STORAGE DEVICES

(75) Inventors: Kevin Jack Erickson, Rochester, MN (US); Zine-Eddine Boutaghou, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/783,362

(22) Filed: Feb. 14, 2001

(Under 37 CFR 1.47)

(51) Int. Cl.[7] .............................. G05B 11/01; A61K 7/50
(52) U.S. Cl. ...................... 318/560; 318/567; 318/569; 360/73.03; 510/141; 510/155; 510/504
(58) Field of Search .................................. 318/567, 560, 318/569; 360/73.03, 78.04

(56) References Cited

U.S. PATENT DOCUMENTS 5,497,277 A * 3/1996 Takahashi ................ 360/73.03
5,982,571 A    11/1999 Calfee et al.
6,185,063 B1 * 2/2001 Cameron ................. 360/78.04
6,236,895 B1 * 5/2001 Romano et al. ........ 318/568.18

FOREIGN PATENT DOCUMENTS

JP          3074190          3/1991

* cited by examiner

Primary Examiner—Karen Masih
(74) Attorney, Agent, or Firm—Roy W. Truelson (57) ABSTRACT

An electric motor, which is preferably a disk drive spindle motor, contains a multi-phase stator driven by switching the phases of drive current at corresponding commutation angles of the rotor. Small semi-random offsets are introduced into the commutation angles at which the drive current is switched, spreading the frequency of excitation over a wider range, and reducing the peak harmonic excitation at the switching frequency. Preferably, a table of offsets is maintained, and an offset from the table is added to each commutation point. The table preferably has more entries than the number of commutation points, the entries being cycled on a round-robin or other basis.

24 Claims, 5 Drawing Sheets

REDUCED NOISE ELECTRIC MOTOR FOR DISK DRIVE DATA STORAGE DEVICES

FIELD OF THE INVENTION

The present invention relates to electric motors, and in particular, to brushless DC spindle motors used for rotating disks within disk drive data storage devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modem computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains one or more disks attached to a common hub or spindle, which are rotated at a constant speed by an electric motor, often called a spindle motor. The electric spindle motor is typically a brushless DC type motor, meaning that it contains a multiple phase stator and a permanent magnet rotor, the different phases of the stator being energized in a sequence by control electronics to impart a torque to the rotor. The sequential switching and driving of the different stator phases can induce mechanical vibrations at harmonic frequencies of the motor driving frequency of the disks. These vibrations may be audibly perceived by a user as a high-pitched whine.

A whining noise emitted by a disk drive storage device can be very annoying or distracting to a user, interfering with user productivity. Additionally, constant excitation at a particular frequency may have other undesirable side effects, such as possible interference with servoing and possible degradation of mechanical components.

Disk drive designers have long recognized the desirability of eliminating any spurious noise or vibration in the drives. Great attention is paid, therefore, to precision machining of mechanical parts and other methods and processes for controlling noise. However, noise abatement is not perfect, and there remains a need to find improved methods of reducing noise in disk drives, and in particular, noise at harmonic frequencies of the disk motor driving frequency.

SUMMARY OF THE INVENTION

In accordance with the present invention, an electric motor, which is preferably a spindle motor of a disk drive, contains a multi-phase stator driven by switching the phases of drive current at corresponding commutation angles of rotation of the rotor. Small variations, herein called semi-random offsets, are introduced into the commutation angles at which the drive current is switched. These variations have the effect of spreading the frequency of excitation over a wider range, thus reducing the peak harmonic excitation at the switching frequency.

In the preferred embodiment, a table of small, semi-random phase shift offsets is maintained, and an offset from the table is added to the commutation point (i.e., the point or angle at which a phase change occurs in the drive current). In one variation of this embodiment, the offset entries from the table are retrieved and added to the commutation points in a round robin sequence. The number of entries in the table N is preferably greater than the number commutation points P in a single revolution of the rotor, and is a prime number or a number having no common factors with P. The semi-random pattern of phase shifts therefore repeats itself every N disk revolutions. If necessary, N can be made sufficiently large so that the fundamental frequency of pattern repetition from the table is too low to be perceptible.

Preferably, semi-random commutation offsets are not employed during a spin-up period when the electronic drive circuitry is attempting to bring the motor up to its rated operating speed, and are only used after the motor has already reached operating speed. This avoids unnecessary interference with the process of spinning up the disk assembly.

It is therefore expected that an electric motor constructed in accordance with the present invention therefore will emit less noise as perceived by a user, and may have additional collateral benefits due to a reduction in mechanical vibration at the motor switching harmonic frequencies.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview of Disk Drive Design

A rotating rigid magnetic disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electromagnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

DETAILED DESCRIPTION

Figure 1:
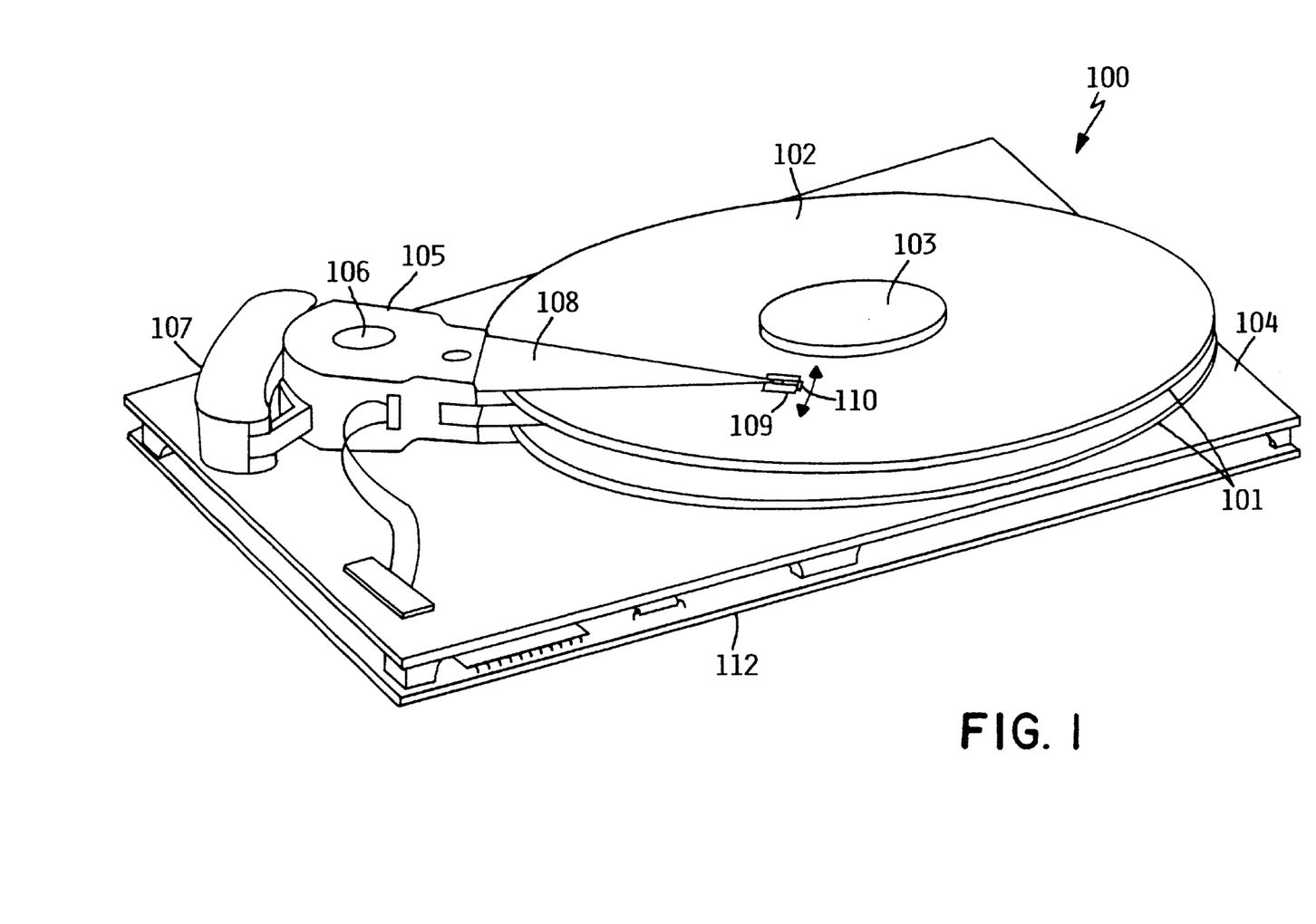
FIG. 1 is a simplified representation of a rotating magnetic disk drive storage device, for use in accordance with the preferred embodiment of the present invention.

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity. The drive motor (not visible in FIG. 1) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
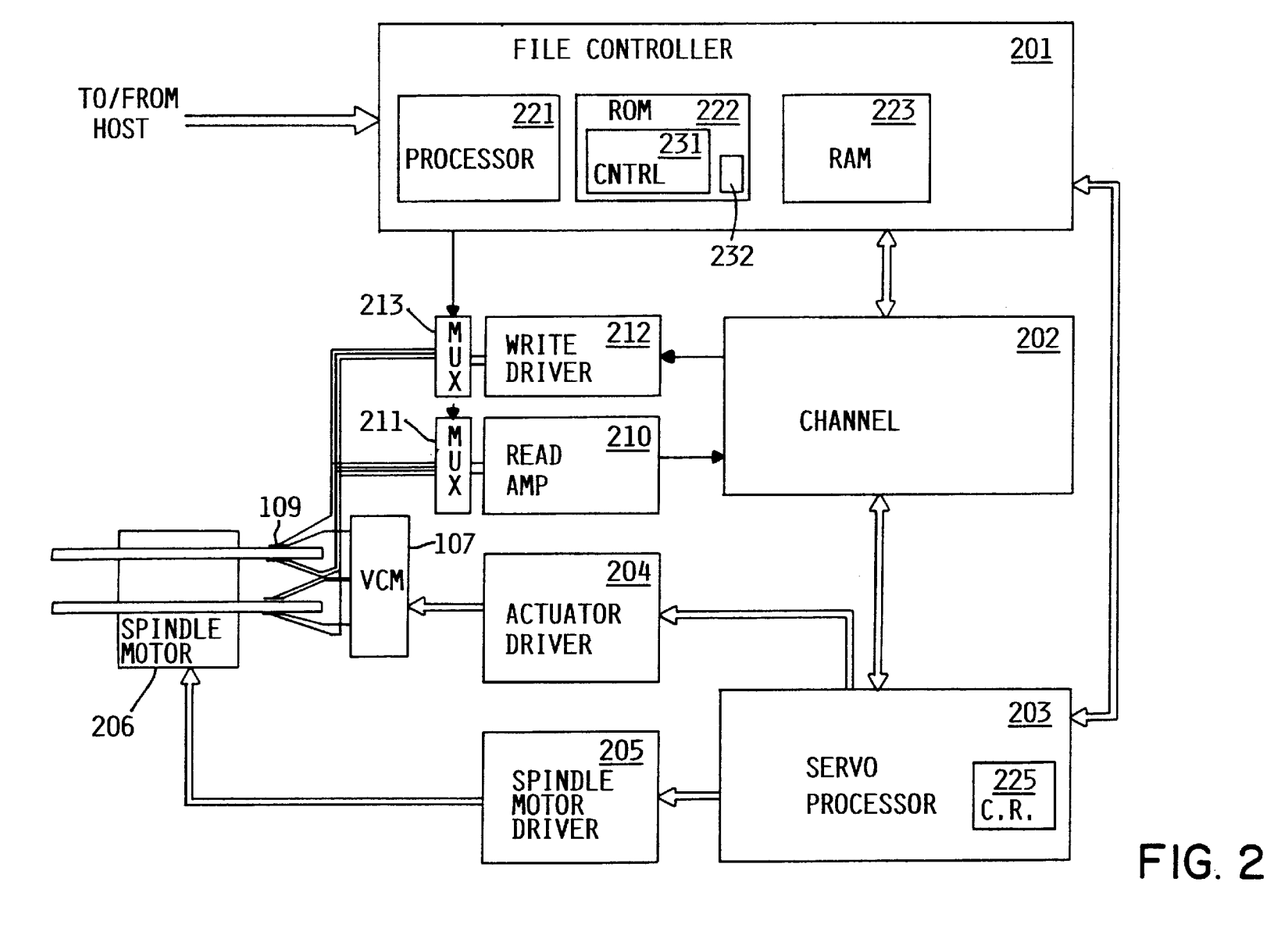
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host. The "host" is usually a computer system such as a desktop computer system or a mainframe computer system, although it may be a special purpose device such as a personal digital assistant (PDA), a digital controller for machinery such as an automobile or robot, or any of various other digital devices. Controller 201 also provides general control of the operation of disk drive 100, including such functions as command interpretation, sector mapping, power-up routines, diagnostics, error recovery, etc. Channel electronics 202 provides modulation and demodulation function for data being written to and read from the disk surface. Servo processor 203 interprets servo signals obtained from reading servo patterns on the disk to control the actuator and spindle motors; it also responds to seek signals from file controller 201. Servo processor 203 determines the necessary parameters for actuator motor and spindle motor, and provides these as inputs to actuator motor drive circuitry 204 and spindle motor drive circuitry 205. Actuator motor drive circuitry 204 in turn provides drive current to actuator voice coil motor (VCM) 107, positioning actuator 105 to a desired location. Spindle motor drive circuitry 205 provides drive current to spindle motor 206, driving the motor at a desired rotational velocity, as described more fully herein.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data for use by a host system. When writing data, channel electronics 202 encodes data according to a predetermined encoding format, and provides this data to write driver 212, which in turn drives current through an inductive write element to cause the data to be written on the disk surface.

Positioning of transducers 110 is achieved by a servo feedback loop system comprising transducers 110, read amp 210, channel electronics 202, servo processor 203, actuator driver 204, and actuator motor 107. Transducers 110 read servo patterns recorded at periodic intervals on disk surfaces 101; these are amplified by read amp 210; the servo patterns are converted to position information by channel electronics 202; position information is interpreted by servo processor 203 to determine an amount of drive current which must be supplied to actuator motor 107; and actuator driver 204 then generates the required drive current in response to a control signal from servo processor 203. Servo processor 203 uses the same information to interpret angular position and provide appropriate control signals to spindle motor driver 205.

File controller 201 preferably includes programmable processor 221 which executes a control program 231 resident in read-only memory (ROM) 222. ROM 222 is a non-volatile semiconductor random access memory, the contents of which are not lost when disk drive 100 is powered down. ROM further includes a randomizing table 232, containing a set of random angular offsets for commutation of spindle motor 206, as described more fully herein. File controller also includes volatile read/write memory (RAM) 223. RAM 223 is used as a temporary cache for data being read from and written to one or more of the disk surfaces. RAM 223 is also used for storing internal state variables necessary for drive operation.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features. It should further be understood that various electronic components such as file controller 201, channel 202 and servo processor 203 are shown in FIG. 2 for illustrative purposes, and that one or more of these may be combined as a single module, or may be embodied in multiple modules.

Figure 3:
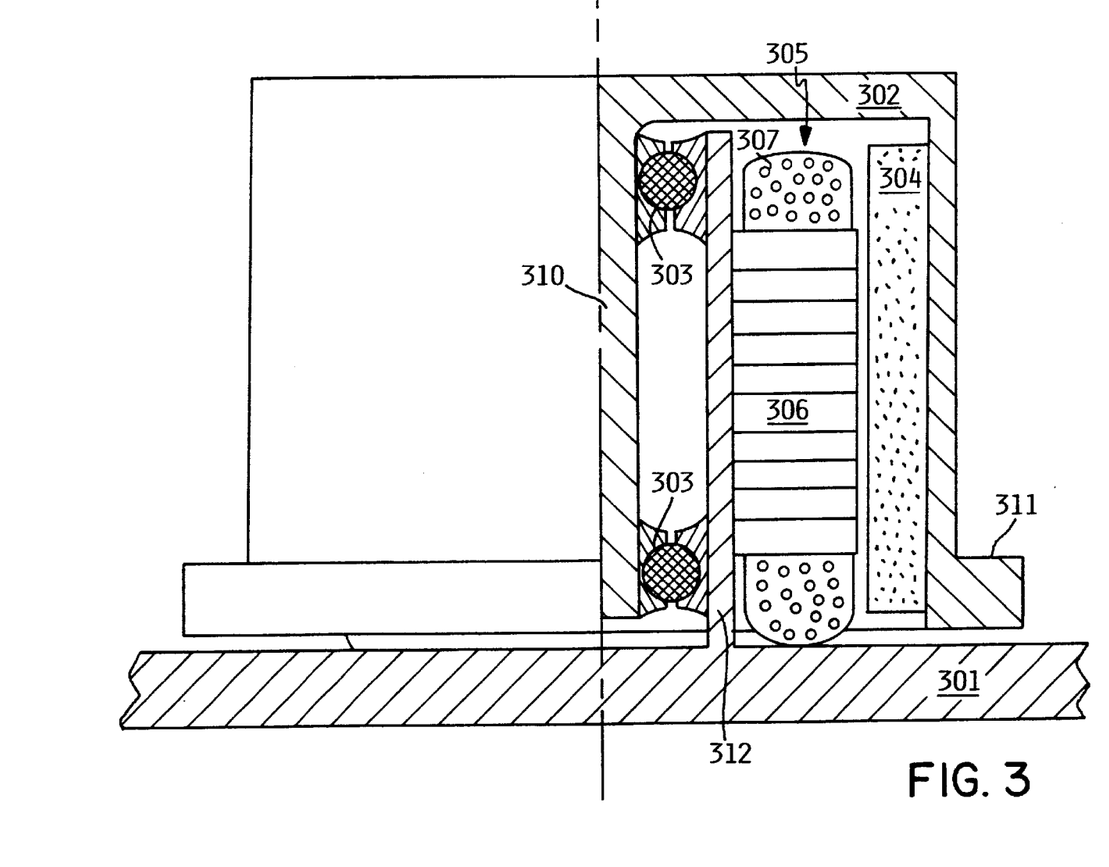
FIG. 3 is a partial cross-sectional view of a disk drive spindle motor, in the plane of the rotational axis, according to the preferred embodiment.

In the preferred embodiment, spindle motor 206 is a brushless DC motor having a multi-phase electromagnetic stator and a permanent magnet rotor, of the so-called "in hub" design. FIG. 3 is a partial cross-sectional view of spindle motor 206, in the plane of the rotational axis. Motor 206 includes a base 301, which is rigidly attached to base 104 of disk drive 100. Rotor housing 302 surrounds the various motor components. Rotor housing includes a central shaft portion 310, which engages bearings 303 mounted to a hollow cylindrical projection 312 of base 301.

Rotor housing includes a flange 311 projecting from the outer bottom edge near the base. When installed in disk drive 100, one or more disks 101 are fitted over the rotor housing 302 and supported by flange 311, the rotor housing then projecting through the central aperture of disks 101, with the disks being clamped against the flange with clamps and spacers (not shown). Thus clamped, the disks rotate in unison with rotor housing 302.

A multi-pole stator 305, containing multiple sets of iron laminations 306 surrounded by respective wire coils 307, is rigidly attached to the cylindrical projection 312 of base 301. A plurality of circumferentially spaced permanent magnets of alternating polarity 304 are rigidly attached to rotor housing 302, imparting torque to rotor housing 302 in the presence of a moving electromagnetic field generated by stator 305.

Figure 4:
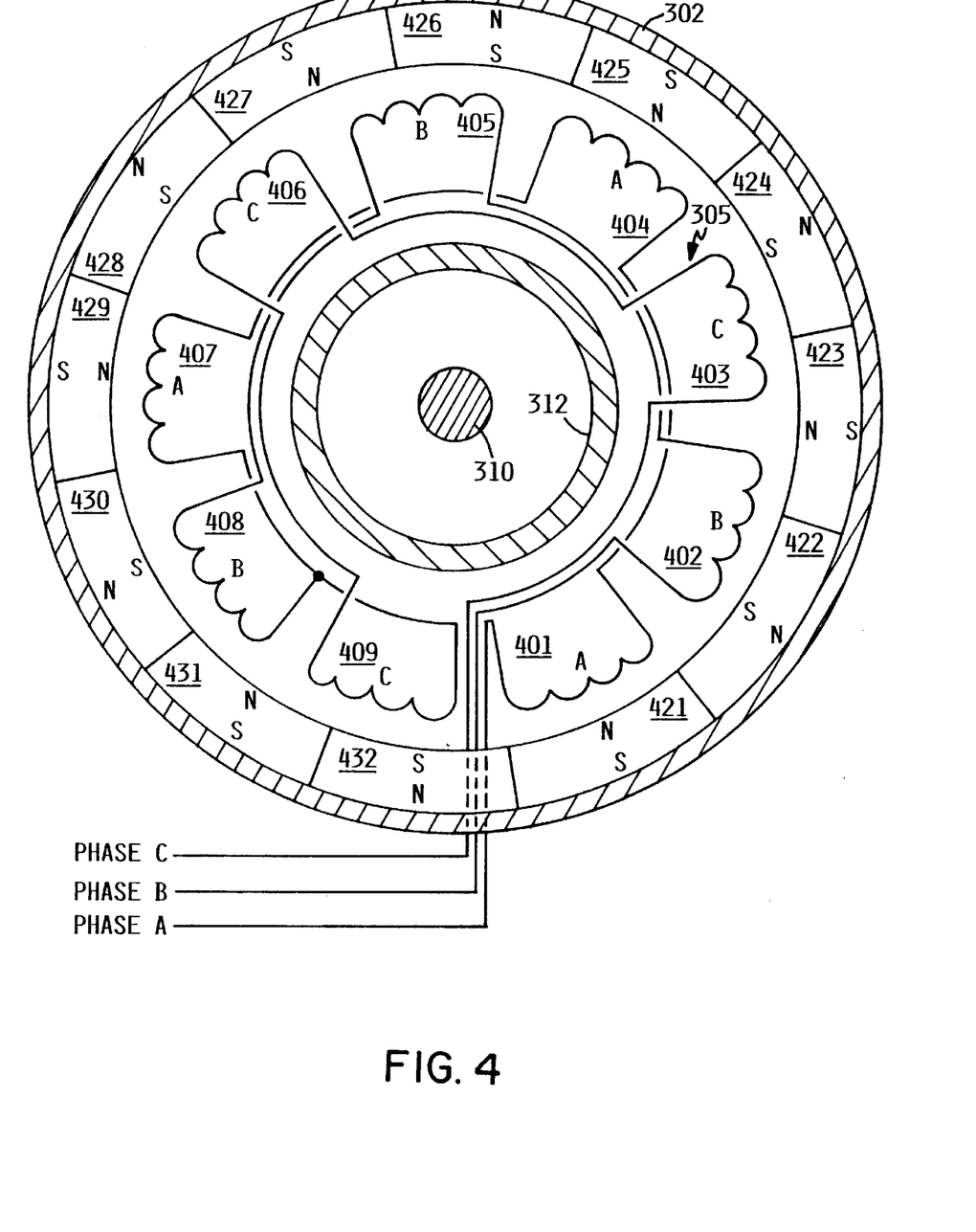
FIG. 4 is a simplified cross-sectional view of a disk drive spindle motor, in a plane perpendicular to the rotational axis, according to the preferred embodiment.

FIG. 4 is a simplified cross-sectional view of motor 206 in a plane perpendicular to the axis of rotation. FIG. 4 shows the arrangement of multiple stator poles and rotor magnets, the stator windings being shown diagrammatically for clarity of illustration. Stator windings are arranged as shown in three phases with three poles per phase, or a total of nine poles 401–409. All windings of a single phase are in series. The three phases are coupled together in a well-known "wye" configuration, wherein all phases are coupled to a common central node. In operation, current is driven through two phases at any one time by driving through a first phase in a forward direction and through a second phase in the reverse direction. E.g., if a current source driver for phase A is switched on, and a current sink driver for phase B is switched on, current will flow from the phase A line, in series through phase A windings 401, 404 and 407, and backward in series through phase B windings 408, 405 and 402, and out through the phase B line. In this case, no current will flow in the phase C windings, since both the driver and the sink for phase C will be switched off. The pair of phases being driven is changed to rotate the magnetic driving field of the stator. Permanent magnets 421–432 are circumferentially arranged in alternating polarity on the inner cylindrical surface of rotor housing 302, as shown. The magnets "chase" the rotating magnetic driving field, causing the rotor to rotate at the speed of rotation of the driving field.

In the exemplary stator/rotor pole configuration of FIG. 4, each pair of driving phases of the stator will be reversed with every pole of revolution of the rotor, i.e. phase pairs A-B, A-C, B-C for one pole, and B-A, C-A, C-B for the next pole. This means that for a 3-phase stator and a 12-pole rotor, it is expected that the pair of driving phases of the stator must be changed 36 times to drive the rotor through one complete revolution. Therefore for this configuration there must be a change in the pair of stator phases being driven with every 10 degrees of revolution of the rotor. The angular position of the rotor at which the stator phases are switched is referred to as a commutation point. In a conventional motor, commutation points would nominally occur at 0°, 10°, 20°, 30°, etc. from some angular reference position of the rotor. In accordance with the present invention, minor random-like variations are introduced into these commutations points. For example, commutation on a particular revolution may occur at 0.23°, 9.89°, 19.97°, 30.30°, and so on. Preferably, commutation does not occur at the same set of points for each revolution, so that in a subsequent revolution of the rotor, the commutation points will be different.

It will be understood that many variations are possible in the arrangement of stator and rotor poles. While twelve permanent magnet poles are shown attached to the rotor in FIG. 4, and the stator contains nine poles (three phases having three poles each), it will be understood by those skilled in the art that the number of permanent magnet poles, stator poles, and stator phases may vary, and the number of commutation points may vary accordingly. It will further be understood that the stator phases could be connected in a "delta" configuration, or that as an additional variation, the illustrated "wye" configuration may contain a central tap allowing an arbitrary single phase to be energized. Furthermore, it would be possible to provide separate drive circuitry and/or separate drive lines to windings of the same phase, so that the windings are driven in parallel and not in series.

It should further be understood that FIGS. 3 and 4 are intended to represent at a high level the major components of a typical disk drive spindle motor. Many variations are possible in the design and placement of bearings, magnets, coils, clamping mechanisms, and the like, within the scope of the present invention.

Commutation requires that the servo processor 203 determine the current angular position of the rotor. In the preferred embodiment, position information read by a read transducer and decoded by channel 202 is used for determining angular position when the rotor is rotating at operational speed. Generally, an alternate method will be used during a power-up routine while the motor is being brought from a stop to operating speed. Alternatively, any of various alternative methods may be used at operating speed as well. Alternative methods include sensing the back EMF of the stator coils, or providing a separate sensor mechanism such as a magnetic encoding wheel. The servo processor 203 uses position information to determine the stator phase pair to be driven, as well as the magnitude(s) of drive current required, and inputs these parameters to spindle motor driver 205, which then generates the required currents.

Preferably, servo processor 203 includes a commutation register 225 which stores the commutation points and corresponding motor phases to be driven. Servo processor 203 compares current rotor position with the values in commutation register 225 to determine the correct phase pair of the stator to be driven. Commutation register 225 preferably contains 36 entries, sufficient for an entire rotor revolution, although it may contain a smaller number of entries which are rotated on a round-robin basis.

In the preferred embodiment, control program 231 executing in processor 221 of file controller 201 controls the operation of disk drive 100 to alter the values in commutation register 225, thus causing servo processor 203 to generate minor semi-random variations in the commutation points. This process is shown at a high level in FIG. 5.

Figure 5:
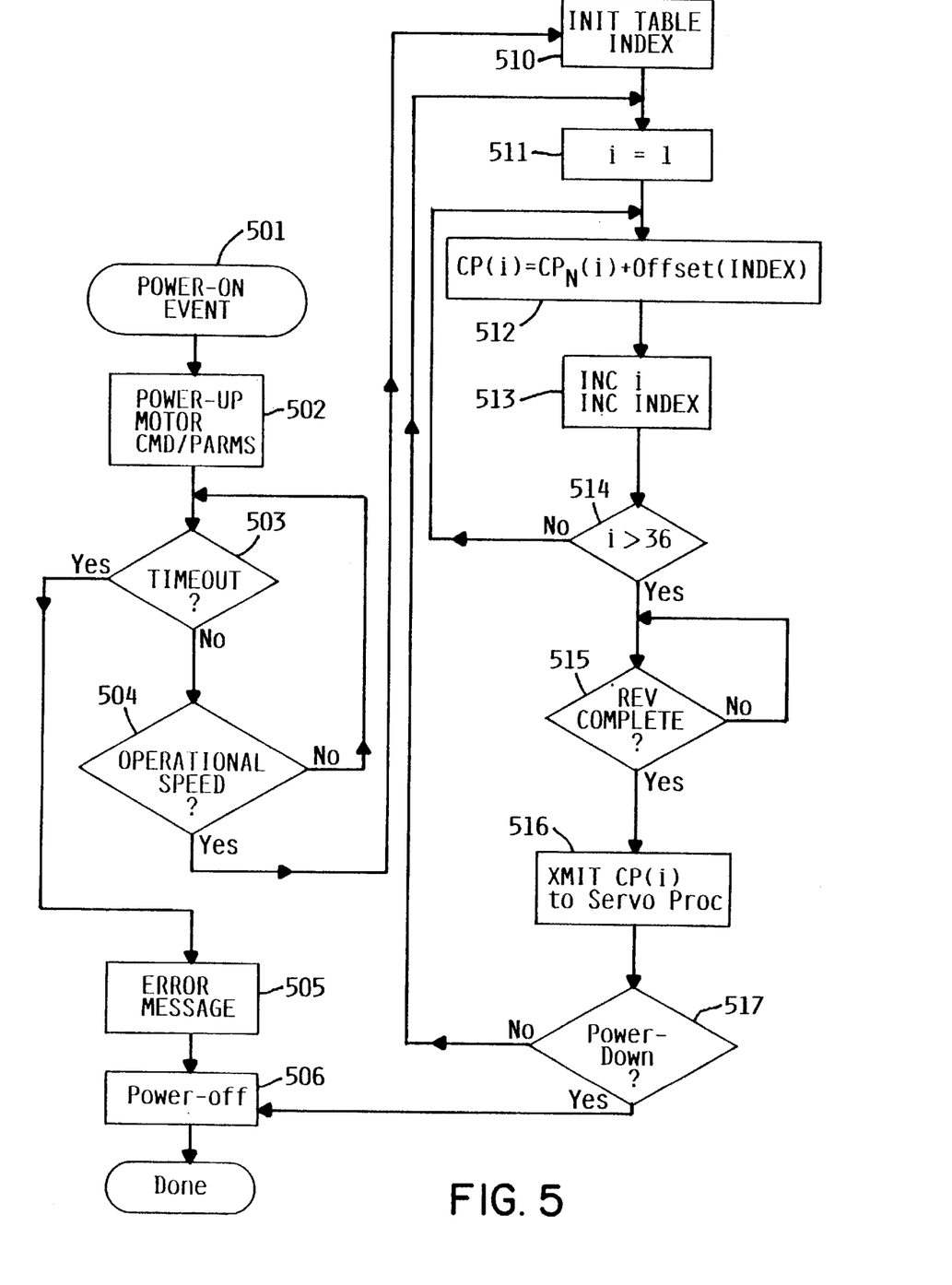
FIG. 5 is a high level flow diagram of the process of operating a disk drive spindle motor, according to the preferred embodiment.

As shown in FIG. 5, disk drive 100 is initially in an off state. In the "off" state, no power is applied to the spindle motor. Drive 100 exits the off state upon the occurrence of a power-on event (block 501). This may occur in one of several ways. Drive 100 may be completely without power, i.e., truly "off", in which case it exits the off state (exits block 501) upon power being applied from an external source such as an ignition switch, causing controller 201 to power-up and a control program to begin execution in processor 221. Alternatively, external power may be applied to the drive at all times, but controller 201 may interrupt power to the spindle motor, channel and other electronics; in this alternative, processor 221 waits in an idle loop for some external command, interrupt, or similar event to exit from block 501.

Upon exiting block 501, control program 231 begins a power-up of the disk drive, which includes bringing spindle motor 206 to operating speed (step 502). In general, the disk transducers are unable to read data recorded on the disks until the spindle motor is near its operational speed. Controller therefore transmits an appropriate power up command to servo processor 203, placing it in a power-up state. At roughly the same time, controller 201 transmits a set of values for storage in commutation register 225, these values being the nominal commutation points (i.e., 0, 10, 20, 30 . . . ) for spindle motor 206. In some cases, the motor may have difficulty starting and the controller may induce motion by any of various known start-up techniques.

With servo processor 203 in the power-up state, it causes spindle motor driver 205 to drive respective pairs of stator windings with a predetermined start-up current (usually the maximum allowable). The servo processor determines angular position as explained above, and compares this to the nominal commutation values in register 225, switching stator phase pairs as each commutation point is reached.

The control program then alternatively checks a power-up timer (step 503) while it waits for the motor to reach operational speed (step 504). It may take several seconds for the motor to reach operational speed. During this period, the controller may be performing diagnostic or other functions, while servo processor 203 continues to drive spindle motor 206 at the rated start-up current, using the nominal commutation values stored in register 225. If the motor fails to reach operational speed within a predetermined maximum period, the "Y" branch is taken from step 503, an error message is generated (step 505), and the drive shuts itself down (step 506). If operational speed is reached before timeout, the "Y" branch is taken from step 504.

After reaching operational speed, the control program initializes an index variable to randomizing table 232 (step 510). Table 232 contains an array of offset values to be added to the nominal commutation angles to determine the actual commutation values to be used by servo processor 203 for switching stator phases. The values in table 232 may be generated by any random or semi-random process, or may be calculated so as not to be random at all, but merely to appear random or scattered when added to the nominal commutation angles as described herein. These values are permanently stored in ROM 222, so they do not change. The number of values stored in table 232 is preferably greater than the number of commutation points in a revolution of the rotor, i.e., greater than 36 in the configuration of the preferred embodiment. To increase the random-appearing nature of the offsets in operation, it is preferred that the number of entries in table 232 be a prime number, or that it be a composite number having no common factors with the number of commutation points in a revolution of the rotor.

The control program then generates a set of 36 commutation points (angles) for a single complete revolution of the rotor, shown as steps 511–514. It first initializes a loop variable i to 1 (step 511). A single commutation point (CP(i)) is then computed as the sum of the nominal commutation point ($CP_N(i)$) corresponding to the loop variable and an offset from table 232 corresponding to the table index variable (step 512). The control program then increments the loop variable i and table index variable (step 513). The loop variable i is incremented by one; the table index may be incremented by one to simply cycle through the entries in table 232 on a round-robin basis, but it would alternatively be possible to achieve additional variability by incrementing the table index on some other basis. E.g., the table index could be incremented by the current value of i, or by some lower order bits in a system clock. Since the number of table index values should not exceed the number of entries in table 232, the new index is the sum of the old index and the increment amount, modulo N, where N is the number of entries in table 232.

The control program then checks the value of i (step 514), and if it does not exceed 36 (the number of commutation points in a revolution), steps 512 and 513 are repeated. When 36 new commutation points have thus been generated, the "Y" branch is taken from step 514.

The control program then waits for the spindle motor to complete its current revolution (step 515). When the revolution is complete, the "Y" branch is taken from step 515. The control program then causes controller 201 to transmit the 36 new commutation point values to servo processor 203, storing them in the corresponding entries of commutation register 225 (step 516). This will cause the new commutation point values to be used on the next succeeding revolution of the rotor.

If no power down indication has been received (step 517), the control program then returns to step 511 to compute a new set of commutation point values for the following revolution of the rotor. If a power down indication is received, the "Y" branch is taken from step 517, and the motor is powered off (step 506).

It will be understood that disk drive operations unrelated to spindle motor operation have not been shown in FIG. 5. In fact, control program 231 typically contains multiple concurrently executing tasks, of which spindle motor control is only one. A typical disk drive responds to many different types of commands; responsive behavior may be very complex; exchange of information with the host may require many steps; etc. These details have been omitted from the description herein for clarity of illustration.

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning digital devices such as disk drives, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD'S, magnetic tape, and transmission-type media such as digital and analog communications links, including wireless communications links. Examples of signal-bearing media are illustrated in FIG. 1 as disk surface 102, in FIG. 2 as ROM 222.

In the preferred embodiment described above, the brushless DC electric motor is used as a spindle motor of a rotating magnetic disk drive data storage device. However, such a motor could be used in other environments as well. It could alternatively be used as a spin motor for an optical disk data storage device, such as a CD-ROM, DVD-ROM, or audio CD player. It could also be used as a drive motor for a magnetic tape data storage device. Finally, it could be used as an electric motor in any of numerous applications unrelated to data storage.

In the preferred embodiment, a control program executing on a programmable processor of a disk file controller generates the commutation points by reference to a table of semi-random offsets, and transfers this data to a commutation register used by a servo processor to perform actual commutation. This arrangement provides the ability to disable the use of semi-random offsets during motor start-up, as well as providing considerable design flexibility. However, it will be appreciated that small semi-random variations in the commutation points could be achieved using many different hardware and software variations. For example, the servo processor itself may generate variations in the commutation points, or the servo processor may contain all motor control logic.

In the preferred embodiment, a set of offset values is stored in a randomizing table and progressively added to commutation angles to produce the effect of small random variations in the commutation angles. Such a table is preferred for ease of computation. It will be appreciated by those skilled in the art that there are numerous methods for producing a similar effect. For example, a random number computational function or special apparatus could produce so-called random numbers for adding to the nominal commutation angles. It is also possible to derive offsets according to some sophisticated pattern which is not intended to be random at all, but is intended merely to spread the motor noise spectrum at the harmonic peaks associated with the frequency of commutation. As used herein and in the claims, "semi-random offset" is intended to encompass any method, including those described as well as others, which produces a scattering of offsets from some nominal commutation profile.

Although a specific embodiment of the invention has been disclosed along with certain alternatives, it will be recognized by those skilled in the art that additional variations in form and detail may be made within the scope of the following claims:

What is claimed is:

1. A rotating magnetic disk drive data storage device, comprising:

a disk drive base;

a rotatably mounted disk and spindle assembly, said disk and spindle assembly comprising at least one rigid disk for recording magnetically encoded data on at least one surface of said at least one rigid disk, said at least one disk being permanently mounted on said disk and spindle assembly;

a movable actuator supporting at least one transducer head, said actuator positioning said at least one transducer head to access said magnetically encoded data on said at least one surface of said at least one rotatably mounted disk;

a spindle motor rotating said at least one rotatably mounted disk and spindle assembly, said spindle motor having a multi-phase electro-magnetic stator and a permanent magnet rotor;

a spindle motor driving apparatus, said spindle motor driving apparatus providing drive current to said multi-phase electromagnetic stator, said spindle motor driving apparatus sequentially switching phases of said drive current at corresponding angles of rotation of said disk and spindle assembly, said spindle motor driving apparatus varying by a respective semi-random offset each successive angle of rotation at which said spindle motor driving apparatus switches phase of said drive current.

2. The rotating magnetic disk drive data storage device of claim 1, wherein each said semi-random offset is obtained from a table containing a plurality of semi-random offset values.

3. The rotating magnetic disk drive data storage device of claim 2, wherein said spindle motor driving apparatus uses sequential semi-random offset values from said table in a round-robin pattern, the number of semi-random offset entries N in said table exceeding a number of commutation points P in said electro-magnetic stator.

4. The rotating magnetic disk drive data storage device of claim 3, wherein the greatest common factor of N and P is one.

5. The rotating magnetic disk drive data storage device of claim 1, wherein said spindle motor driving apparatus does not vary by said respective semi-random offset each successive angle of rotation at power-up of said spindle motor until said spindle motor has achieved a predetermined rotational speed, and thereafter varies by said respective semi-random offset each successive angle of rotation.

6. The rotating magnetic disk drive data storage device of claim 1, wherein said spindle motor driving apparatus comprises:
  a memory;
  a programmable processor executing a control program stored in said memory; and
  a servo processor responsive to control parameters issued by said programmable processor.

7. The rotating magnetic disk drive data storage device of claim 6, wherein said servo processor includes a commutation register for identifying a plurality of commutation points, wherein data in said commutation register is provided by said control program executing on said programmable processor.

8. An electric motor, comprising:
  a base;
  a multi-phase electro-magnetic stator mounted to said base;
  a rotor rotatably mounted to said base, said rotor having at least one permanent magnet which rotates said rotor responsive to alternating magnetic fields generated by said stator; and
  a motor driving apparatus, said motor driving apparatus providing drive current to said multi-phase electro-magnetic stator, said motor driving apparatus sequentially switching phases of said drive current at corresponding angles of rotation of said rotor, said motor driving apparatus varying by a respective semi-random offset each successive angle of rotation at which said motor driving apparatus switches phase of said drive current.

9. The electric motor of claim 8, wherein each said semi-random offset is obtained from a table containing a plurality of semi-random offset values.

10. The electric motor of claim 9, wherein said motor driving apparatus uses sequential semi-random offset values from said table in a round-robin pattern, the number of semi-random offset entries N in said table exceeding a number of commutation points P in said electro-magnetic stator.

11. The electric motor of claim 10, wherein the greatest common factor of N and P is one.

12. The electric motor of claim 8, wherein said motor driving apparatus does not vary by said respective semi-random offset each successive angle of rotation at power-up of said electric motor until said electric motor has achieved a predetermined rotational speed, and thereafter varies by said respective semi-random offset each successive angle of rotation.

13. The electric motor device of claim 8, wherein said motor driving apparatus comprises:
  a memory;
  a programmable processor executing a control program stored in said memory;
  a commutation register for identifying a plurality of commutation points, wherein data in said commutation register is provided by said control program executing on said programmable processor; and
  commutation apparatus which switches phases of said drive current at commutation points specified by said commutation register.

14. The electric motor of claim 8, wherein said motor is a spindle motor for rotating one or more data storage disks of a rotating magnetic disk drive data storage device.

15. A method of operating an electric motor, said electric motor comprising a multi-phase electro-magnetic stator and a rotor having at least one permanent magnet which rotates said rotor responsive to alternating magnetic fields generated by said stator, said method comprising the steps of:
  defining a plurality of nominal commutation angles for switching corresponding phases of said electro-magnetic stator being driven by electric current;
  adding a respective semi-random offset to each respective nominal commutation angle to produce a corresponding plurality of adjusted commutation angles; and
  switching phases of said electro-magnetic stator being driven by electric current at said corresponding plurality of adjusted commutation angles.

16. The method of operating an electric motor of claim 15, wherein said step of adding a respective semi-random offset to each respective nominal commutation angle comprises the step of obtaining the respective semi-random offset from a table containing a plurality of semi-random offset values.

17. The method of operating an electric motor of claim 16, wherein said step of obtaining the respective semi-random offset from a table comprises accessing the plurality of semi-random offset values in the table in a round-robin pattern, the number of semi-random offset entries N in said table exceeding a number of commutation points P in said electro-magnetic stator.

18. The method of operating an electric motor of claim 17, wherein the greatest common factor of N and P is one.

19. The method of operating an electric motor of claim 15, wherein said step of adding a respective semi-random offset to each respective nominal commutation angle to produce a corresponding plurality of adjusted commutation angles is not performed until said electric motor has achieved a predetermined rotational speed, and is performed thereafter.

20. A program product for controlling the operation of an electric motor, said electric motor comprising a multi-phase electro-magnetic stator and a rotor having at least one permanent magnet which rotates said rotor responsive to alternating magnetic fields generated by said stator, said program product comprising:
  a plurality of processor-executable instructions recorded on signal-bearing media readable by a controller of said electric motor, wherein said instructions, when executed by said processor, cause said motor controller to perform the steps of:
  (a) defining a plurality of nominal commutation angles for switching corresponding phases of said electro-magnetic stator being driven by electric current;

(b) adding a respective semi-random offset to each respective nominal commutation angle to produce a corresponding plurality of adjusted commutation angles; and (c) switching phases of said electro-magnetic stator being driven by electric current at said corresponding plurality of adjusted commutation angles.

21. The program product for controlling the operation of an electric motor of claim 20, wherein said step of adding a respective semi-random offset to each respective nominal commutation angle comprises the step of obtaining the respective semi-random offset from a table containing a plurality of semi-random offset values.

22. The program product for controlling the operation of an electric motor of claim 21, wherein said step of obtaining the respective semi-random offset from a table comprises accessing the plurality of semi-random offset values in the table in a round-robin pattern, the number of semi-random offset entries N in said table exceeding a number of commutation points P in said electro-magnetic stator.

23. The program product for controlling the operation of an electric motor of claim 22, wherein the greatest common factor of N and P is one.

24. The program product for controlling the operation of an electric motor of claim 20, wherein said step of adding a respective semi-random offset to each respective nominal commutation angle to produce a corresponding plurality of adjusted commutation angles is not performed until said electric motor has achieved a predetermined rotational speed, and is performed thereafter.

* * * * *